US009165073B2

(12) United States Patent
Kiraz et al.

(10) Patent No.: US 9,165,073 B2
(45) Date of Patent: Oct. 20, 2015

(54) APPARATUS, SYSTEM AND METHOD FOR A WEB-BASED INTERACTIVE VIDEO PLATFORM

(75) Inventors: Robert Kiraz, Northridge, CA (US); Edward Dekeratry, Santa Monica, CA (US); Ian Serlin, San Francisco, CA (US); Cory O'Daniel, Playa del Rey, CA (US)

(73) Assignee: Shoutpoint, Inc., Newport Beach, CA (US)

( * ) Notice: Subject to any disclaimer, the term of this patent is extended or adjusted under 35 U.S.C. 154(b) by 75 days.

(21) Appl. No.: 12/858,091

(22) Filed: Aug. 17, 2010

(65) Prior Publication Data

US 2011/0093784 A1    Apr. 21, 2011

Related U.S. Application Data

(60) Provisional application No. 61/234,626, filed on Aug. 17, 2009.

(51) Int. Cl.
G06F 3/00      (2006.01)
G06F 17/30     (2006.01)

(52) U.S. Cl.
CPC .............................. *G06F 17/30864* (2013.01)

(58) Field of Classification Search
CPC ... G06Q 50/22; G06Q 10/10; G06Q 10/1053; G06Q 50/24; G06Q 10/06; G06Q 10/06398; G06Q 30/08; G06Q 10/1095; G06Q 30/02; G06Q 30/04; G06Q 10/06311; G06Q 10/063112; G06Q 10/06316; G06Q 10/06375
USPC ......................................... 715/715, 753, 719
See application file for complete search history.

(56) References Cited

U.S. PATENT DOCUMENTS 3,210,476 A    10/1965  Shaer
3,692,947 A    9/1972   Lewis
(Continued)

FOREIGN PATENT DOCUMENTS

EP    1317123    6/2003

OTHER PUBLICATIONS

Michael Arrington, Use TokBox to Set Up Instant Video Chat (Aug. 14, 2007). http://techcrunch.com/2007/08/14/use-tokbox-to-set-up-instant-video-chat/.*

(Continued)

*Primary Examiner* — Amy Ng
*Assistant Examiner* — Di Xiao
(74) *Attorney, Agent, or Firm* — Knobbe, Martens, Olson & Bear, LLP

(57) ABSTRACT

An apparatus, a system, a method and a computer program product are provided. The system includes a controller configured to broadcast a web-based meeting between a first user and a second user. The system further includes a graphical user interface configured to display the broadcasted web-based meeting. The controller is configured to receive a request from the first user through the graphical user interface. The request includes one of a text question, a recorded video question and a request from the first user to present a live video question to the second user. The controller is further configured to broadcast the request through the graphical user interface. When the received request includes the request from the first user to present the live video question, the controller is further configured to broadcast the request as a real time video feed of the first user, so that the first user can ask the question in real time and the second user can respond to the first user's question in real time.

39 Claims, 14 Drawing Sheets

(56) References Cited

U.S. PATENT DOCUMENTS

| | | |
|---|---|---|
| 4,109,111 A | 8/1978 | Cook |
| 4,455,455 A | 6/1984 | Little |
| 4,475,189 A | 10/1984 | Herr et al. |
| 4,541,087 A | 9/1985 | Comstock |
| 4,796,293 A | 1/1989 | Blinken et al. |
| 4,937,856 A | 6/1990 | Natarajan |
| 5,408,526 A | 4/1995 | McFarland et al. |
| 5,440,624 A | 8/1995 | Schoof, II |
| 5,475,747 A | 12/1995 | Bales et al. |
| 5,483,587 A | 1/1996 | Hogan et al. |
| 5,483,588 A | 1/1996 | Eaton et al. |
| 5,495,522 A | 2/1996 | Allen et al. |
| 5,680,392 A | 10/1997 | Semaan |
| 5,699,352 A | 12/1997 | Kriete et al. |
| 5,825,858 A | 10/1998 | Shaffer et al. |
| 5,903,629 A | 5/1999 | Campbell, IV et al. |
| 5,903,637 A | 5/1999 | Hogan et al. |
| 5,916,302 A | 6/1999 | Dunn et al. |
| 5,924,041 A | 7/1999 | Alperovich et al. |
| 5,953,049 A | 9/1999 | Horn et al. |
| 5,978,463 A | 11/1999 | Jurkevics et al. |
| 5,999,208 A | 12/1999 | McNerney et al. |
| 5,999,966 A | 12/1999 | McDougall et al. |
| 6,023,452 A | 2/2000 | Shiragaki |
| 6,067,027 A | 5/2000 | Buer |
| 6,118,864 A | 9/2000 | Chang et al. |
| 6,141,341 A | 10/2000 | Jones et al. |
| 6,195,357 B1 | 2/2001 | Polcyn |
| 6,201,859 B1 | 3/2001 | Memhard et al. |
| 6,275,575 B1 | 8/2001 | Wu |
| 6,282,278 B1 | 8/2001 | Doganata et al. |
| 6,304,648 B1 | 10/2001 | Chang |
| 6,320,944 B1 | 11/2001 | Schlossman et al. |
| 6,327,363 B1 | 12/2001 | Henderson et al. |
| 6,330,321 B2 | 12/2001 | Detampel, Jr. et al. |
| 6,332,153 B1 | 12/2001 | Cohen |
| 6,343,314 B1 | 1/2002 | Ludwig et al. |
| 6,363,079 B1 | 3/2002 | Barzegar et al. |
| 6,370,393 B1 | 4/2002 | Otsuka et al. |
| 6,404,764 B1 | 6/2002 | Jones et al. |
| 6,411,605 B1 | 6/2002 | Vance et al. |
| 6,418,214 B1 | 7/2002 | Smythe et al. |
| 6,421,438 B1 | 7/2002 | Denton et al. |
| 6,424,646 B1 | 7/2002 | Gerszberg et al. |
| 6,453,034 B1 | 9/2002 | Donovan et al. |
| 6,463,051 B1 | 10/2002 | Ford |
| 6,466,550 B1 | 10/2002 | Foster et al. |
| 6,501,739 B1 | 12/2002 | Cohen |
| 6,501,740 B1 | 12/2002 | Sun et al. |
| 6,507,740 B2 | 1/2003 | Shi |
| 6,539,087 B1 | 3/2003 | Walsh et al. |
| 6,580,695 B2 | 6/2003 | Kluck et al. |
| 6,597,667 B1 | 7/2003 | Cerna |
| 6,606,305 B1 | 8/2003 | Boyle et al. |
| 6,625,271 B1 | 9/2003 | O'Malley et al. |
| 6,646,997 B1 | 11/2003 | Baxley et al. |
| 6,657,975 B1 | 12/2003 | Baxley et al. |
| 6,690,771 B2 | 2/2004 | Siemens et al. |
| 6,697,476 B1 | 2/2004 | O'Malley et al. |
| 6,741,697 B2 | 5/2004 | Benson et al. |
| 6,772,436 B1 | 8/2004 | Doganata et al. |
| 6,804,340 B2 | 10/2004 | Lee et al. |
| 6,807,563 B1 | 10/2004 | Christofferson et al. |
| 6,829,349 B1 | 12/2004 | Neale et al. |
| 6,839,416 B1 | 1/2005 | Shaffer |
| 6,839,417 B2 | 1/2005 | Weisman et al. |
| 6,876,734 B1 | 4/2005 | Summers et al. |
| 6,876,736 B2 | 4/2005 | Lamy et al. |
| 6,888,925 B2 | 5/2005 | Spitzer et al. |
| 6,907,449 B2 | 6/2005 | Srinivasan |
| 6,910,081 B1 | 6/2005 | Hammond |
| 6,956,932 B2 | 10/2005 | Ciavolino |
| 6,961,416 B1 | 11/2005 | Summers et al. |
| 6,967,672 B1 | 11/2005 | Huber et al. |
| 6,996,221 B1 | 2/2006 | Baiyor et al. |
| 7,006,455 B1 | 2/2006 | Fandrianto et al. |
| 7,010,622 B1 | 3/2006 | Bauer et al. |
| 7,062,025 B2 | 6/2006 | Summers et al. |
| 7,107,312 B2 | 9/2006 | Hackbarth et al. |
| 7,113,512 B1 | 9/2006 | Holmgren et al. |
| 7,119,828 B1 | 10/2006 | Kizherman et al. |
| 7,151,753 B2 | 12/2006 | Chaney et al. |
| 7,221,951 B2 | 5/2007 | Anvekar et al. |
| 7,257,090 B2 | 8/2007 | Seavers et al. |
| 7,266,091 B2 | 9/2007 | Singh et al. |
| 7,277,697 B2 | 10/2007 | Desai et al. |
| 7,310,320 B2 | 12/2007 | Decker et al. |
| 7,317,791 B2 | 1/2008 | Carlson |
| 7,330,541 B1 | 2/2008 | Surazski et al. |
| 7,346,654 B1 | 3/2008 | Weiss |
| 7,353,251 B1 | 4/2008 | Balakrishnan |
| 7,412,047 B2 | 8/2008 | Nguyen et al. |
| 7,454,460 B2 | 11/2008 | Ivashin |
| 7,483,400 B2 | 1/2009 | Kuusinen et al. |
| 7,483,526 B2 | 1/2009 | Keohane et al. |
| 7,492,730 B2 | 2/2009 | Eshel et al. |
| 7,561,536 B2 | 7/2009 | Roundy et al. |
| 7,580,375 B1 | 8/2009 | Friedrich et al. |
| 7,643,436 B2 | 1/2010 | Provino et al. |
| 7,643,628 B2 | 1/2010 | Hans et al. |
| 7,701,926 B2 | 4/2010 | Gavish et al. |
| 7,756,540 B2 | 7/2010 | Tillet et al. |
| 7,852,998 B1 | 12/2010 | Smith et al. |
| 7,929,011 B2 | 4/2011 | Elbaze et al. |
| 7,944,861 B2 | 5/2011 | Smith et al. |
| 7,978,838 B2 | 7/2011 | Rodman et al. |
| 7,985,138 B2 | 7/2011 | Acharya et al. |
| 8,102,984 B2 | 1/2012 | Rodman et al. |
| 8,126,968 B2 | 2/2012 | Rodman et al. |
| 8,140,980 B2 | 3/2012 | Gunasekar et al. |
| 8,144,854 B2 | 3/2012 | Rodman et al. |
| 8,170,191 B2 | 5/2012 | Potekhin et al. |
| 8,223,942 B2 | 7/2012 | Rodman et al. |
| 8,266,535 B2 | 9/2012 | Brown et al. |
| 8,881,027 B1 | 11/2014 | Brown et al. |
| 2002/0085030 A1 | 7/2002 | Ghani |
| 2002/0106066 A1 | 8/2002 | Swanson et al. |
| 2002/0111153 A1 | 8/2002 | Hartmaier et al. |
| 2002/0118808 A1 | 8/2002 | Kelleher et al. |
| 2002/0118809 A1* | 8/2002 | Eisenberg ............ 379/202.01 |
| 2002/0143573 A1* | 10/2002 | Bryce et al. ............ 705/1 |
| 2002/0169836 A1 | 11/2002 | Hood et al. |
| 2002/0181686 A1 | 12/2002 | Howard et al. |
| 2003/0021400 A1 | 1/2003 | Grandgent et al. |
| 2003/0055899 A1 | 3/2003 | Burger et al. |
| 2003/0074444 A1 | 4/2003 | Ahrens, Jr. et al. |
| 2003/0163526 A1 | 8/2003 | Clarisse et al. |
| 2003/0182374 A1 | 9/2003 | Haldar |
| 2004/0047461 A1 | 3/2004 | Weisman et al. |
| 2004/0051732 A1 | 3/2004 | White et al. |
| 2004/0080504 A1 | 4/2004 | Salesky et al. |
| 2004/0086093 A1 | 5/2004 | Schranz |
| 2004/0101119 A1 | 5/2004 | Malcolm et al. |
| 2004/0107255 A1 | 6/2004 | Ludwig et al. |
| 2004/0119814 A1 | 6/2004 | Clisham et al. |
| 2004/0125933 A1 | 7/2004 | Jun et al. |
| 2004/0218744 A1 | 11/2004 | Nguyen et al. |
| 2004/0228292 A1 | 11/2004 | Edwards |
| 2004/0248552 A1 | 12/2004 | Mazurick et al. |
| 2005/0018826 A1 | 1/2005 | Benco et al. |
| 2005/0034079 A1 | 2/2005 | Gunasekar et al. |
| 2005/0099984 A1 | 5/2005 | Alakoye et al. |
| 2005/0135279 A1 | 6/2005 | Zabawskyj |
| 2005/0169452 A1 | 8/2005 | Prigogin et al. |
| 2005/0187816 A1 | 8/2005 | Smukler |
| 2005/0207357 A1 | 9/2005 | Koga |
| 2005/0286498 A1 | 12/2005 | Rand et al. |
| 2005/0286699 A1 | 12/2005 | Gagle |
| 2006/0056440 A1 | 3/2006 | Khartabil |
| 2006/0062376 A1 | 3/2006 | Pickford |
| 2006/0067250 A1 | 3/2006 | Boyer et al. |
| 2006/0067499 A1 | 3/2006 | Oliveira et al. |
| 2006/0104433 A1 | 5/2006 | Simpson et al. |
| 2006/0189337 A1 | 8/2006 | Farrill et al. |

(56) References Cited

U.S. PATENT DOCUMENTS

| | | |
|---|---|---|
| 2006/0210044 A1 | 9/2006 | Widger |
| 2006/0239212 A1 | 10/2006 | Pirzada et al. |
| 2006/0268753 A1 | 11/2006 | Tidwell et al. |
| 2006/0274675 A1 | 12/2006 | Kizhnerman |
| 2006/0293073 A1 | 12/2006 | Rengaraju et al. |
| 2007/0088601 A1* | 4/2007 | Money et al. .......... 705/10 |
| 2007/0121859 A1 | 5/2007 | Smelyansky et al. |
| 2007/0133774 A1 | 6/2007 | Fujimoto |
| 2007/0208806 A1 | 9/2007 | Mordecai et al. |
| 2007/0258576 A1 | 11/2007 | Klein et al. |
| 2007/0294263 A1 | 12/2007 | Punj et al. |
| 2007/0300165 A1 | 12/2007 | Haveliwala |
| 2009/0060157 A1 | 3/2009 | Kim et al. |
| 2009/0074174 A1 | 3/2009 | Allen et al. |
| 2009/0080640 A1 | 3/2009 | Waalkes et al. |
| 2009/0086953 A1 | 4/2009 | Vendrow |
| 2009/0103709 A1 | 4/2009 | Conway et al. |
| 2009/0222318 A1* | 9/2009 | Anelevitz et al. .......... 705/10 |
| 2009/0228323 A1* | 9/2009 | Ebrahimian .......... 705/9 |
| 2009/0274279 A1 | 11/2009 | Reynolds |
| 2009/0310774 A1 | 12/2009 | Hendricks et al. |
| 2010/0034122 A1 | 2/2010 | Croy et al. |
| 2010/0070554 A1* | 3/2010 | Richardson et al. .......... 709/202 |
| 2010/0226287 A1 | 9/2010 | Horvath et al. |
| 2010/0260075 A1 | 10/2010 | Smith et al. |

OTHER PUBLICATIONS

Polycom Introduces Industry-Leading SoundStation2 Conference Phone for Avaya Customers, PR Newswire, Feb. 27, 2006, 2 pages.
Avaya IP Video Telephony Solution Integrates Desktop, Multipoint and Group Video Conferencing from Polycom, PR Newswire, Dec. 13, 2005, 3 pages.
Polycom Announces First Scalable, High Performance Bridges for High Definition Video Conferencing; Polycom Unveils HD Support on MGC Video Bridges for up to 90 Simultaneous HD Calls; Reveals HD Upgrade Plan for VSX 8000 Video Endpoints, Business Wire, Oct. 17, 2005, 3 pages.
Polycom Connects Conference Phones to the PC, Enabling Enhanced Quality for Internet Calling Services, Desktop Video, Business Wire, Sep. 20, 2005, 2 pages.
Macromedia and Avaya to Deliver Integrated Conferencing Solutions to Service Providers and Enterprises; Macromedia Selected for Premier Membership in Avaya Developer Connection Program, Business Wire, Sep. 20, 2005, 2 pages.
ACT Teleconferencing Announces eMeeting Feature Upgrade Global Web Conferencing Service, PR Newswire, Dec. 8, 2004, 2 pages.
Polycom VSX Video Conferencing & Collaboration Wins 9 out of 10 Review from CNE; Outperforms Competition in Video/Voice Clarity, Business Wire, Jul. 25, 2005, 3 pages.
Polycom Completes Award-Winning VSX Video Conferencing Line with New Systems and Enhancements, Business Wire, Jul. 13, 2005, 4 pages.
Polycom Broadens Integrated Conference Room Solutions with Flexible Options for Any Meeting Environment, Business Wire, Apr. 26, 2005, 2 pages.
Polycom Makes Instant Content Sharing Available to 1.7 Million Conference Phones with Breakthrough Appliance; Polycom QSX Device Enables Simple, Secure, Ad-hoc Content Sharing by Simply Dialing a Polycom SoundStation Conference Phone, Business Wire, Apr. 25, 2005, 3 pages.
Japan Telecom and Polycom Announce Partnership to Deliver Video Conferencing to Small and Medium Sized Businesses, Business Wire, Dec. 8, 2004, 3 pages.
Polycom Sets New Standard in Voice Conferencing with Next Generation Triangular-Shaped SoundStation Conference Phone, Business Wire, Dec. 6, 2004, 3 pages.
Polycom Launches Wireless Conference Phone, Video Display, eWeek, Apr. 19, 2004, 2 pages.
Polycom Expands Unified Conferencing for Service Providers, eWeek, Mar. 15, 2004, 2 pages.

Polycom Enhances VSX Video Conferencing Systems with Improved Video and Audio Quality and Extended Data Sharing, Business Wire, Oct. 20, 2004, 2 pages.
Polycom Delivers Foundation for Next-Gen Conferencing Networks with Introduction of SIP, Business Wire, Oct. 11, 2004, 3 pages.
Polycom Ships SoundStation2W—First Wireless SoundStation Conference Phone, Business Wire, Sep. 27, 2004, 3 pages.
Polycom Enhances ReadiVoice Reservationless Audio Conferencing Solution for Service Providers, Business Wire, Aug. 17, 2004, 2 pages.
Polycom Delivers First 'Surround' Stereo, Conference Phone/Video Integration & SIP Video for Award-Winning VSX Line, Business Wire, Jul. 12, 2004, 3 pages.
Sonim and Polycom to Demonstrate PoC-Based Conference Calling Application at CTIA, Business Wire, Mar. 22, 2004, 2 pages.
IVCi and Polycom Deliver Turnkey IP Video Conferencing Solution for Small and Medium-Sized Enterprises, Business Wire, May 20, 2004, 2 pages.
Polycom Adds New Best in Class Audio, Video, Web and Data Solutions to the Polycom Office, Expanding Accessibility and Benefits of Rich Media Collaboration, Business Wire, Apr. 19, 2004, 3 pages.
Polycom Announces First Wireless SoundStation Conference Phone, Setting New Standard for Everyday Voice Conferencing, Business Wire, Apr. 19, 2004, 3 pages.
Polycom Redefines Personal Desktop Conferencing, Business Wire, Jul. 7, 2003, 3 pages.
Polycom Announces New Revolutionary Multipoint Conferencing Features Available Through Major Service Providers, Business Wire, May 14, 2003, 3 pages.
Polycom Expands Conferencing (Polycom's SoundStation VTX 1000), eWeek, Mar. 3, 2003, 2 pages.
Genesys Conferencing to Provide Complete Conferencing Solution for Polycom Customers, Business Wire, Apr. 23, 2002, 3 pages.
Polycom Announces SoundStation Premier Interoperable With Nortel Networks Meridian 1 PBX; New SoundStation Premier 550D is the Industry's First Full-Duplex Voice Conferencing Phone With a TCM Interface to the Nortel Networks Meridian 1 PBX, PR Newswire, Mar. 25, 2002, 2 pages.
Polycom Launches VoicePlus—Breakthrough Multi-Network Voice, Video and Web Collaboration Solution; Polycom to Debut Unified Conferencing Infrastructure Solution for Enterprises and Service Providers at FOSE Government Trade Show, PR Newswire, Mar. 18, 2002, 2 pages.
Polycom, Alcatel Deliver Voice Over IP Conference Phone Solution; Polycom Extends Audioconferencing Leadership Into IP With SoundStation IP 3000 Now Shipping With Alcatel's OmniPCX 4400, PR Newswire, Nov. 27, 2001, 2 pages.
Polycom Introduces Conference-on-Demand for Telephone-Like Video Communications, PR Newswire, Oct. 22, 2001, 2 pages.
Polycom Technology in Cisco's IP Conference Station, PR Newswire, Dec. 13, 2000, 2 pages.
Spectel Announces Launch of Industry's Largest-Ever Conferencing Bridge; New Fully Integrated Confertel 7000 Bridge Offers Up to 4,080 Ports, PR Newswire, Dec. 6, 2000, 2 pages.
Devoney, Take Another Look, Intel's Intel ProShare 550, PictureTel's PictureTel 550, VTEL's Vtel SmartStation and Polycom's ViewStation 512/MP, Sm@rt Reseller, vol. 2, No. 30, p. 48, Nov. 29, 1999, 4 pages.
Polycom ViewStation Software Release 4.0 Now Available to Customers Worldwide; Extends Functionality and Performance Beyond Traditional Videoconferencing With Innovative Ease of Use and Communications Features, PR Newswire, Dec. 22, 1998, 2 pages.
Lucent Technologies and Polycom Announce New Conference Phones, PR Newswire, Jan. 6, 1997, 2 pages.
Polycom's New Desktop and Conference Room Products Raise Audioconferencing Quality to Highest Level, PR Newswire, Sep. 30, 1996, 3 pages.
Northern Telecom's Video Teleconferencing System, The New York Times, p. C3, Jun. 11, 1992, 1 page.
Voice Technologies Group Announces Release of its new VoiceBridge Series II PBX Integration Unit for Northern Telecom Meridian 1 Systems, News Release, p. 1, May 6, 1992, 2 pages.

(56) References Cited

OTHER PUBLICATIONS

PBX: Octel Announces Digital Meridian Integration Device (DMID) for Northern Telecom Meridian 1 PBX, Edge, on & about AT&T, vol. 6, No. 164, Sep. 16, 1991, 1 page.
VoiceBridge Integration for Northern Telecom SL1 PBXs, News Release, p. 1, Jul. 8, 1991, 2 pages.
IBM Announces Architecture for Computer/Telephone Communications, Rolm, Siemens, Northern Telecom and AT&T to Provide Links, News Release, p. 1, May 15, 1990, 1 page.
Macker et al., "IVOX—The Interactive Voice eXchange Application," Naval Research Laboratory, Washington DC, Feb. 20, 1996, 17 pages.
Yocom et al., "Large IP-PBXs: A Well-matched Quartet," Business Communications Review; Jan. 2004, 34,1, ProQuest Technology Collection, pp. 26-40.
ACT Teleconferencing Audio Conferencing and ReadyConnect products, 2 pages.
Brown, Jim, Teleconference bridge links up to 15 callers, Network World, Dec. 21, 1987, 1 page.
Burstyn, Paris H., Encounters of the electronic Kind, Network World, Sep. 29, 1986, 2 pages.
Frontier ConferTech, "Sonata Integrated Teleconferencing System Operator Manual,", Apr. 29, 1998, 15 pages.
Cummings, Joanne, Videoconferencing rollouts abound at ComNet show, Network World, Feb. 8, 1993, 2 pages.
Duffy, Jim, Start-up unveils standards videoconferencing switch, Network World, Jun. 15, 1992, 2 pages.
Ferrari, et al., "Distributed advance reservation of real-time connections," International Computer Science Institute, Mar. 1995, 21 pages.
Herbalife and ACT Teleconferencing Break Guinness World Record, PR Newswire, Mar. 29, 2004, 3 pages.
ACT Teleconferencing Receives Guinness Certification, PR Newswire, Oct. 24, 2004, 2 pages.
Latest conferencing products, Communications News (2001), V. 38, N. 2, p. 48, Feb. 2001, 4 pages.
Mace, "CaucusLink lowers cost of conferencing," InfoWorld, vol. 13, No. 44, Nov. 4, 1991, 1 page.
Meyer, Jim, The Portable Lawyer, ABA Journal, Sep. 1991, 8 pages.
PictureTel Corporation, "Concorde 4500 User's Notebook,", 1998, 114 pages.
Polycom Enhances ReadiVoice Reservationless Audio Conferencing Solution for Service Providers, Business Wire, Aug. 17, 2004, 3 pages.
Polycom, Inc., "Polycom Networking Solutions Guide," 8 pages.
Polycom, ReadiVoice Administration & Maintenance Guide, Polycom Guides, Dec. 2006, 321 pages.
Voyant Technologies, "ReadiVoice Intelligent Voice Conferencing System Administration Manual," 2001, 206 pages.
Roseman, et al., "GroupKit: A Groupware Toolkit for Building Real-Time Conferencing Applications," CSCW 92 Proceedings, Nov. 1992, pp. 43-50.
Schooler, Eve M., "A Distributed Architecture for Multimedia Conference Control," USC/Information Sciences Institute, Nov. 1991, 21 pages.
Smith, Paxton J., "Voice Conferencing over IP Networks," Department of Electrical & Computer Engineering, McGill University, Jan. 2002, 140 pages.
Spectel 700 and 780 Platforms, 2002, 2 pages.
Spectel Reserver Application for Lotus Notes 1.2 Installation and Administration Guide, 2004, 74 pages.
Srinivas et al., "MONET: A Multi-media System for Conferencing and Application Sharing in Distributed Systems," CERC Technical Report Series; Research Note, Feb. 1992, 19 pages.
Sullivan, Joe, T.120 conferencing standards ease data sharing, Network World, Jun. 19, 1995, 1 page.
Tele-Town Hall LLC, "Tele-Town Hall a New Way for Elected Officials to Interact Live with Constituents," Nov. 2005, 2 pages.
Vander Veen, Chad, "Phone Home," Mar. 2006, 4 pages.
Morrill, Jim, "Technologies help politicians brave new world," Nov. 2006, 2 pages.
Pasadena Star-News newspaper, Editorial, "Legislative Connection," Mar. 2006, 2 pages.
Tele-Town Hall LLC, Tele-Town Hall Website, Mar. and Apr. 2007, 5 pages.
ConferTech International Announces New Generation Allegro 3.00.0 Conferencing System, Oct. 1996, 3 pages.
The Pulver Report, SIP is Happening, May 6, 1999, 3 pages.
WTS Bureau Systems, Inc., "eMeeting.net", 1999, in 31 pages.
eMeeting.net, Inc., "eMeeting.net: Web enabled conference calls. Powered by TXU Communications," available at http://web.archive.org/web/20030215115634/http://www.emeeting.net/, captured Feb. 2003, accessed Apr. 10, 2015.
eMeeting.net, Inc., "White Paper—eMeeting.net and Associated Technology", believed to be available at least as early as Feb. 2003, in 8 pages.
eMeeting.net, Inc., "eMeeting.net Product Definition", believed to be available at least as early as Feb. 2003, in 3 pages.
Trey Smith, "eMeeting.net Phase 2 Databases", believed to be available at least as early as Feb. 2003, in 3 pages.
Eve M. Schooler, "A Distributed Architecture for Multimedia Conference Control", Information Sciences Institute, ISI/RR-91-289, Nov. 1991, pp. 1-18.
Polycom, Inc., "Administrator Guide SoundPoint/SoundStation IP SIP", Version 1.5.x, Apr. 19, 2005, in 166 pages.
Polycom, Inc., "ReadiVoice Release Notes-v2.53.0", Catalog No. 3725-70002-009G2, 2005, in 53 pages.
Polycom, Inc., "ReadiVoice Subscriber Guide", Catalog No. 3725-70007-009F1 (Oct. 2006) v. 3.0, 2006, in 38 pages.
U.S. Appl. No. 13/417,124, filed Mar. 9, 2012, Christiano et al.
U.S. Appl. No. 13/417,067, filed Mar. 9, 2012, Christiano et al.
U.S. Appl. No. 14/727,430, filed Jun. 1, 2015, Christiano et al.
U.S. Appl. No. 13/417,112, filed Mar. 9, 2012, Christiano et al.
Portway et al., Teleconferencing & Distance Learning, 1994.
Summers, Official Microsoft NetMeeting Book, 1998.

* cited by examiner

APPARATUS, SYSTEM AND METHOD FOR A WEB-BASED INTERACTIVE VIDEO PLATFORM

CROSS REFERENCE TO RELATED APPLICATION

This application claims priority under 35 U.S.C. §119(e) of U.S. Provisional Patent Application Ser. No. 61/234,626, filed on Aug. 17, 2009. The subject matter of the earlier filed application is hereby incorporated by reference.

BACKGROUND

1. Field:

Embodiments of the invention generally relate to a web-based interactive video platform. More particularly, certain embodiments of the invention relate to an apparatus, a system, a method and a computer program product for providing a web-based interactive video platform that allows multiple audience members to interact/dialogue in real time via video and/or text chat.

2. Description of the Related Art

Town hall meetings have been created as an informal public meeting, where members of a community are invited to voice their opinions and hear the responses from public figures and elected officials. Town hall meetings are an effective way for these individuals to meet face-to-face with members of the community. However, town hall meetings are limited by, for example, the size of the venue (i.e., the number of people that can be held in the venue), and the ability of community members to physically attend the meeting.

With the advent of social media, interactive video platforms, such as YouTube™, Facebook™, Twitter™, MySpace™ and various webcasting tools, have been created to provide public figures, public officials and even the general public with the ability to disseminate and exchange information, not only with a local community, but also with individuals located around the world.

Unlike conventional town hall meetings though, these interactive video platforms only provide these individuals with a one-way, live interaction/dialogue with audience members. For example, a host or broadcaster is able to stream a live broadcast of information to his or her audience; however, audience members are only able to informally "interact" with the host or broadcaster via a text message or comment, a text chat, or a telephone call, that may be recorded and answered by the host or broadcaster at a later period in time. Teleconferencing has been paired with these interactive video platforms; however, many individuals do not have access to teleconferencing tools, and therefore are unable to fully benefit from a direct, live interaction with the host or broadcaster.

SUMMARY

In accordance with an embodiment of the invention, there is provided a system, which includes a controller that is configured to broadcast a web-based meeting between a first user and a second user, and a graphical user interface configured to display the broadcast web-based meeting. The controller is configured to receive a request from the first user through the graphical user interface. The request includes one of a text question, a recorded video question and a request from the first user to present a live video question to the second user. The controller is further configured to broadcast the request through the graphical user interface. When the received request includes the request from the first user to present the live video question, the controller is configured to broadcast the request as a real time video feed of the first user, so that the first user can ask the question in real time and the second user can respond to the first user's question in real time.

In accordance with another embodiment of the invention, there is provided an apparatus, which includes at least one memory including computer program code, and at least one processor. The at least one memory and the computer program code are configured to, with the at least one processor, cause the apparatus at least to.

In accordance with another embodiment of the invention, there is provided a method, which includes broadcasting a web-based meeting between a first user and a second user through a graphical user interface, and receiving a request from the first user through the graphical user interface. The request includes one of a text question, a recorded video question and a request from the first user to present a live video question to the second user. The method further includes broadcasting the request through the graphical user interface. When the received request includes the request from the first user to present the live video question, the step of broadcasting the request includes broadcasting the request as a real time video feed of the first user, so that the first user can ask the question in real time and the second user can respond to the first user's question in real time.

In accordance with another embodiment of the invention, there is provided a computer program product embodied on a non-transitory computer readable medium. The computer program product is encoded with instructions to control a processor to perform a process. The process includes broadcasting a web-based meeting between a first user and a second user through a graphical user interface, and receiving a request from the first user through the graphical user interface. The request includes one of a text question, a recorded video question and a request from the first user to present a live video question to the second user. The process further includes broadcasting the request through the graphical user interface. When the received request includes the request from the first user to present the live video question, the step of broadcasting the request includes broadcasting the request as a real time video feed of the first user, so that the first user can ask the question in real time and the second user can respond to the first user's question in real time.

BRIEF DESCRIPTION OF THE DRAWINGS

Further aspects, details, advantages and modifications of the invention will become apparent from the following detailed description of the embodiments, which is to be taken in conjunction with the accompanying drawings, in which.

DETAILED DESCRIPTION

Figure 1:
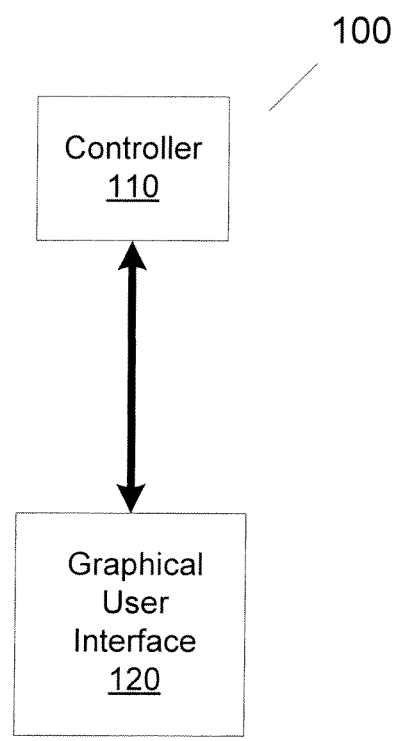
FIG. 1 shows a schematic block diagram of a system, in accordance with an embodiment of the invention.

It will be readily understood that the components of the invention, as generally described and illustrated in the figures herein, may be arranged and designed in a wide variety of different configurations. Thus, the following detailed description of the embodiments of the apparatus, the system, the method and the computer program product, as represented in the attached figures, is not intended to limit the scope of the invention as claimed, but is merely representative of selected embodiments of the invention.

If desired, the different functions discussed below may be performed in a different order and/or concurrently with each other. Furthermore, if desired, one or more of the above-described functions may be optional or may be combined. As such, the foregoing description should be considered as merely illustrative of the principles, teachings and embodiments of this invention, and not in limitation thereof.

Embodiments of the invention combine hardware and software components to create a system, an apparatus, a method and a computer program product for providing a web-based interactive video platform that allows multiple audience members to interact/dialogue in real time via video or text chat. The web-based interactive video platform provides audience members with the ability to engage in a direct, live dialogue with the host or broadcaster (hereinafter referred to as a "host"), in a web-based, town hall-type meeting format. The web-based interactive video platform may also be attended by multiple users who are not in direct dialogue or interaction with the host or broadcaster. They are simply "spectators" to the platform.

In accordance with certain embodiments of the invention, the host can stream a live broadcast of information (e.g., videos, pictures, text, etc.) to a virtual auditorium of viewers, and can receive, in addition to recorded text and video question, live video calls from the audience to interactively respond to the opinions and questions of audience members.

In accordance with certain embodiments of the invention, a user of the platform is able to create an event, for example a "free" event, that integrates advertising within the broadcast, and to create another event for a fee, for example an "enterprise" event, that allows the user to customize and brand his or her event with, for example, a personal logo(s), a personal sponsor(s), pre-roll videos and direct marketing tools.

In accordance with certain embodiments of the invention, a user of the platform is able to charge admission to a ticketed event by requiring viewers to purchase and redeem virtual credits.

In accordance with certain embodiments of the invention, a user may include a host, a producer, an attendee, an editor, a co-host or a screener of the event. The host of the event can create and cancel an event, and can perform all other functions, using a graphical user interface, that the other user-types are able to perform, except being able to ask a text or video question, or screen questions. The host can start, pause and terminate the event. The host can also assign initial roles to other users of the platform during the event, while also taking on the role of the producer of the event.

The producer of the event can perform all of the functions discussed above for the host, using the graphical user interface, except that the producer's video stream is hidden from the event, so that the producer can run the event from "behind-the-scenes."

The attendee of the event is the user in the audience that joins the event, for example, by RSVPing to a scheduled event and/or joining an event when it is started. Using the graphical user interface, the attendee can watch the video broadcast (i.e., a "spectator"), can participate in the event via text chat, can submit live video/text questions to be reviewed by the host/producer, a co-host, and/or a screener, and answered by the host or co-host, and can access customizable modules or applications, for example, Twitter™, Facebook™, mapping tools, charting tools, presentation tools, etc. As will be discussed in more detail below, only a host or co-host can broadcast the live video/text questions from attendees.

The editor of the event can perform all of the functions discussed above for the attendee, using the graphical user interface. Additionally, the editor can perform "one-click editing" to switch between users that are activated as "live speakers" in real-time. For example, the editor can click on a thumbnail of a single user to immediately cut to that user, or the editor can select a "multi-shot" button to setup 2-shots, 3-shots, 4-shots, etc., to immediately cut to two selected users, three selected users, four selected users, etc. The editor can also assign a user to all user-types, except the role of host or producer.

The co-host of the event can broadcast his or her video live to the entire audience, can respond to the audience's text and video questions, and can perform all of the functions discussed above for the editor, using the graphical user interface. The co-host can also assign a user to all user-types, except the role of host or producer.

The screener of the event is a unique user-type that can screen the queue of attendee text/video questions, and can interact via a video dialogue with an attendee who asked a question, for example, "behind-the-scenes." The screener can approve, remove or kick the attendee from the event, in addition to providing annotations about the attendee and his or her question for the host, co-host, or producer to review. Hence, the screener "pre-screens" questions for the host and/or the co-host, so that they can broadcast and respond only to approved (i.e., relevant) questions. The screener can also assign a user to all user-types, except the role of host or producer FIG. 1 shows a schematic block diagram of a system, in accordance with an embodiment of the invention. The system 100 includes a controller 110 and a graphical user interface 120. The controller 110 broadcasts a web-based meeting between a first user and a second user. The graphical user interface 120 displays the broadcasted web-based meeting. The controller 110 receives a request from the first user through the graphical user interface 120. The request can include one of a text question, a recorded video question and a request from the first user to present a live video question to the second user. The controller 110 broadcasts the request through the graphical user interface 120. When the received request includes the request from the first user to present the live video question, the controller 110 broadcasts the request as a real time video feed of the first user, so that the first user can ask the question in real time and the second user can respond to the first user's question in real time.

In accordance with an embodiment of the invention, the graphical user interface 120 can include a web-based application that can be embedded on a third-party site or blog using embedded code (i.e., an embedded player). The web-based application can be accessed without leaving the page that it is embedded on.

The controller 110 broadcasts, through the graphical user interface 120, an individual video feed of the first user, the second user and any other user that joins the web-based meeting, or multiple video feeds of any combination of users in real time. The controller 110 broadcasts, through the graphical user interface 120, a list of requests from the first user or any other user. The list can be sorted.

The first user can include an attendee of the web-based meeting. The second user and the other users can include one of a host, a producer, a co-host, a screener, an editor and an attendee of the web-based meeting.

When the received request includes one of the recorded video question or the live video question from the first user, the controller 110 generates an off-line meeting between the first user and one of the other users, so that the other user can screen the first user and the video question before the controller 110 broadcasts the received request. The controller 110 broadcasts the received request, when the other user approves the first user and the video question.

Figure 2:
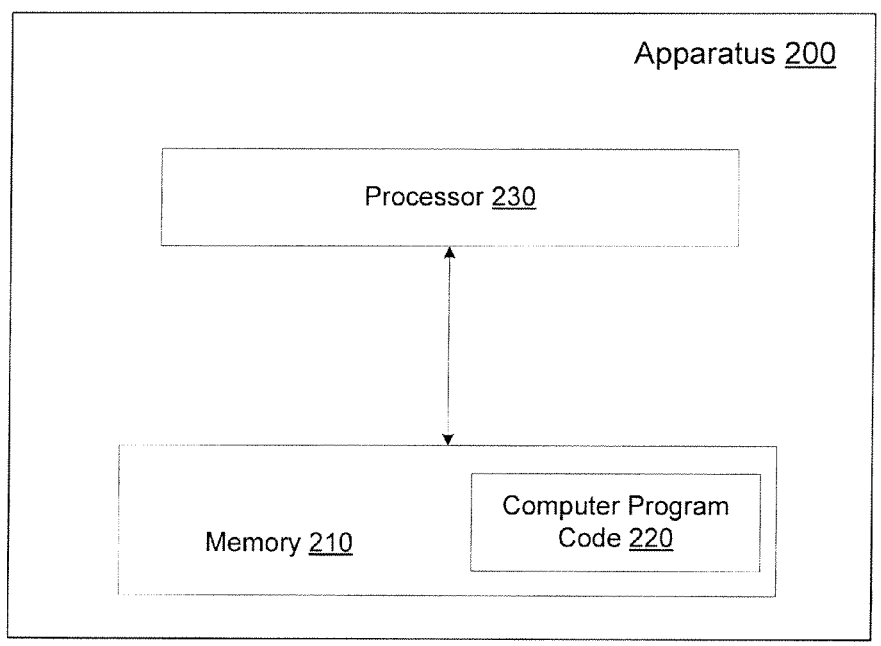
FIG. 2 shows a schematic block diagram of an apparatus, in accordance with an embodiment of the invention.

FIG. 2 shows a schematic block diagram of an apparatus, in accordance with an embodiment of the invention. The apparatus 200 includes a memory 210 including computer program code 220. The computer program code 220 is embodied on a computer readable non-transitory medium. The apparatus 200 includes a processor 230 for processing information and executing instructions or operations. The memory 210 is coupled to the processor 230 for storing information and instructions to be executed by the processor 230. The computer program code 220 is encoded with instructions to control the processor 230 to perform the method discussed below and illustrated in FIG. 8.

While a single memory 210 and a single processor 230 are illustrated in FIG. 2, multiple memory and multiple processors may be utilized according to other embodiments.

In accordance with an embodiment of the invention, the processor 230 broadcasts a web-based meeting between a first user and a second user through a graphical user interface. The processor 230 receives a request from the first user through the graphical user interface, and stores the request in the memory 210. As discussed for system 100, the request can include one of a text question, a recorded video question and a request from the first user to present a live video question to the second user. The processor 230 retrieves the request from the memory 210, when requested by the second user, and broadcasts the request through the graphical user interface. When the received request includes the request from the first user to present the live video question, the processor 230 broadcasts the request as a real time video feed of the first user, so that the first user can ask the question in real time and the second user can respond to the first user's question in real time.

The processor 230 broadcasts, through the graphical user interface, an individual video feed of the first user, the second user and any other user that joins the web-based meeting, or multiple video feeds of any combination of users in real time. The processor 230 broadcasts, through the graphical user interface, a list of requests from the first user or any other user. The list can be sorted.

When the received request includes one of the recorded video question or the live video question from the first user, the processor 230 generates an off-line meeting between the first user and another user, so that the other user can screen the first user and the video question before the processor 230 broadcasts the received request to the second user. The processor 230 broadcasts the received request, when the other user approves the first user and the video question.

Figure 3:
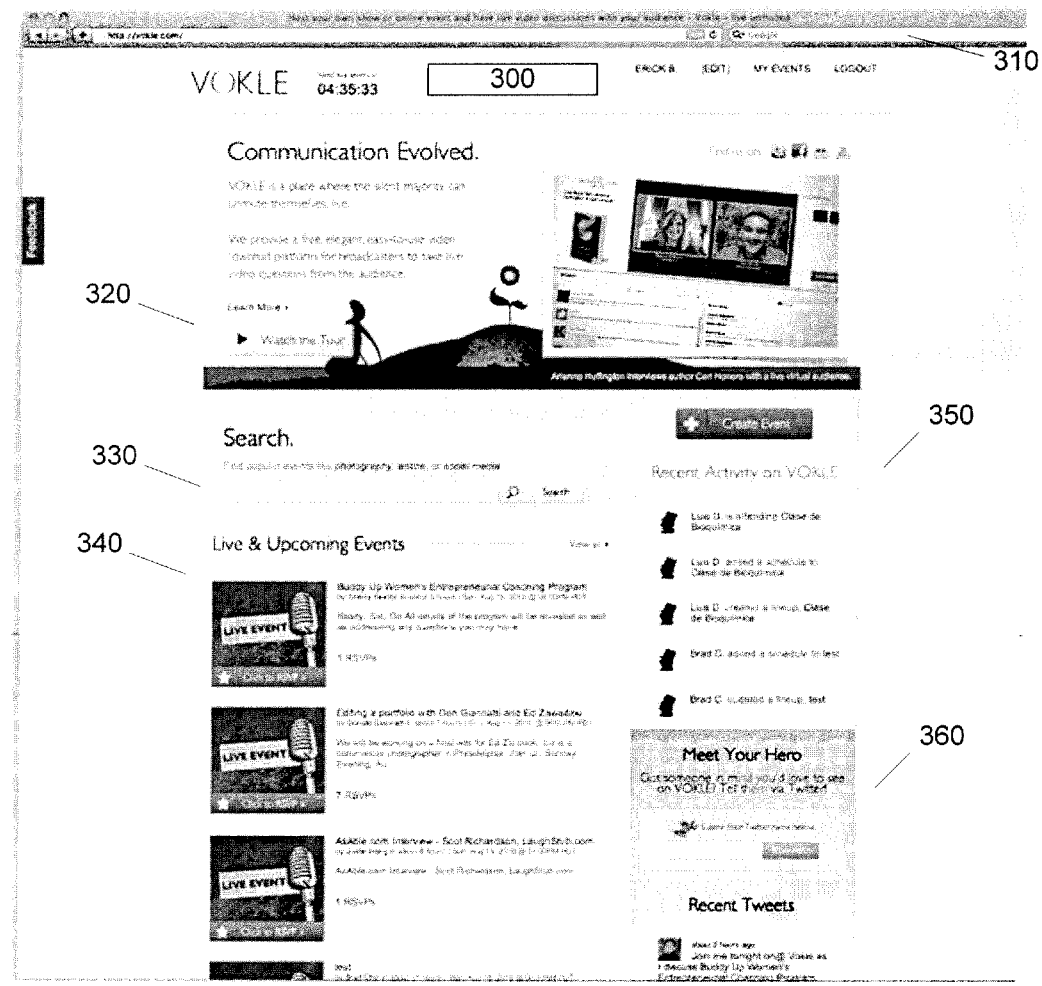
FIG. 3 shows a home page view of a graphical user interface of the system shown in FIG. 1, in accordance with an embodiment of the invention.

FIG. 3 shows a home page view of a graphical user interface of the system shown in FIG. 1, in accordance with an embodiment of the invention. The graphical user interface 120 can provide live, viewing and broadcasting features for a town hall-type meeting for the user-types discussed above.

The home page view 300 of the graphical user interface 120 can include a user access bar 310, a quick tour link 320, a search bar 330, a listing of live and upcoming events 340, a listing of recent activity on the platform 350, and a host request 360.

In accordance with an embodiment of the invention, the user access bar 310 provides the user with access to the system 100 discussed above and shown in FIG. 1. The user access bar 310 includes a registration link and a log in link. The user can register for an account to access the system 100, or can log in to the system 100, using the graphical user interface 120, by entering his "username" and "password" established during the registration process or by entering the user's social media "username" and "password" (i.e., the "username" and "password" of the user's Twitter™ or Facebook™ account). Upon entry into the system 100, the user can access all of the features for viewing and broadcasting a town hall-type meeting, including receiving and responding to live video questions from audience members.

The quick tour link 320 provides the user with a quick tour of the features of the platform. The search bar 330 provides the user with a search tool for searching for an event by a keyword, for example, an associated tag. The listing of live and upcoming events 340 provides the user with links to live and upcoming events that the user can immediately attend (i.e., join an event) or schedule to attend (i.e., RSVP to an event). If the user RSVPs to an event, the user will be notified via an electronic communication (i.e., email, SMS text, etc.) when the RSVP'd event is about to begin. The listing of recent activity on the platform 350 provides the user with a listing of, and associated links to, real-time, user activity and past events. The host request 360 provides the user with a request tool for requesting an individual to join the platform using social media (i.e., sending a request to the individual via Twitter™ or Facebook™).

Figure 4:
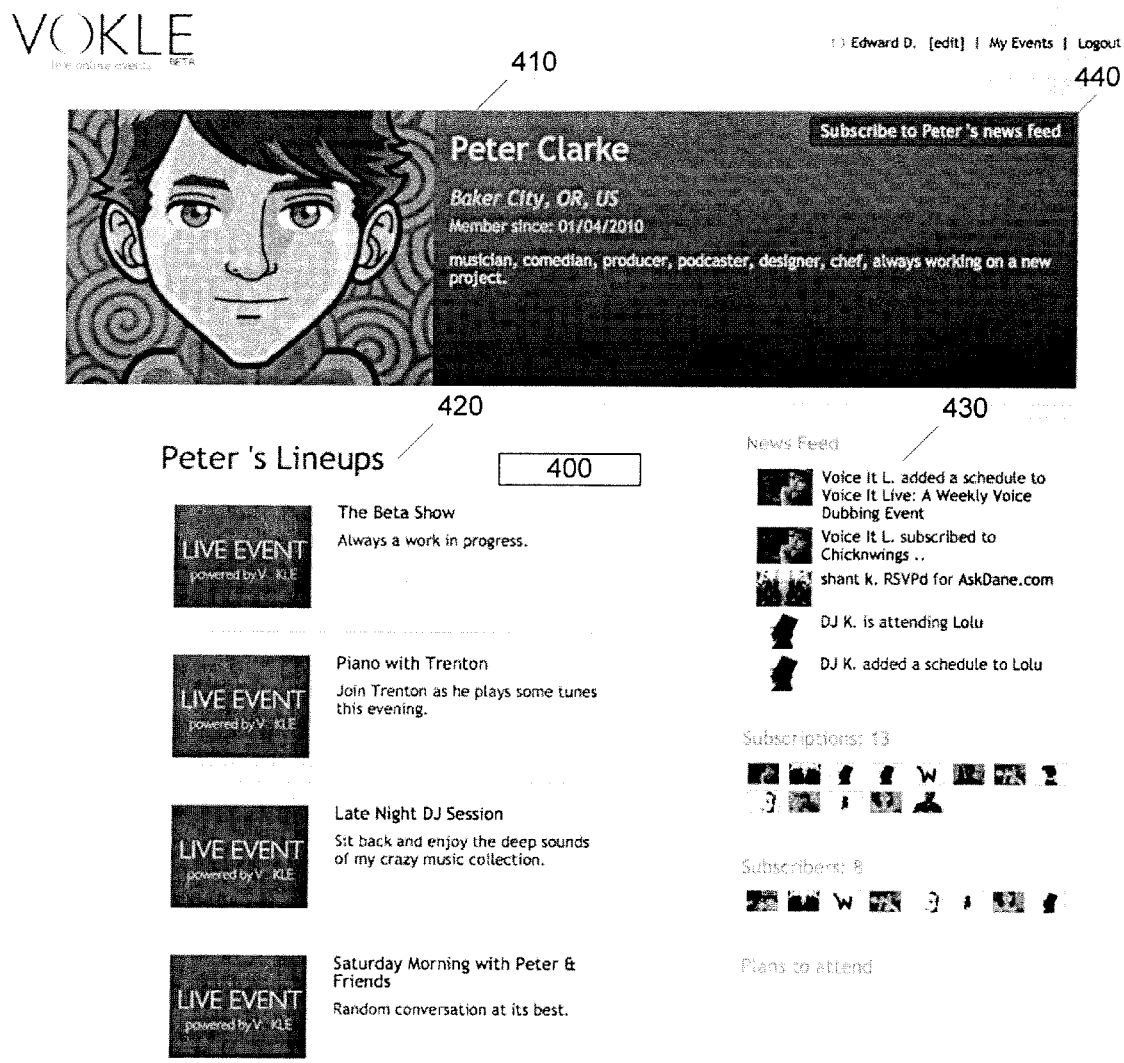
FIG. 4 shows a profile page view for a user of the graphical user interface, in accordance with an embodiment of the invention.

FIG. 4 shows a profile page view for a user of the graphical user interface, in accordance with an embodiment of the invention. Once the user logs in to the system 100, using the graphical user interface 120, the user can access a user profile page 400, as shown in FIG. 4. The user profile page 400 includes a user's personal information 410 (i.e., name, geographical location, membership status and interests/tags), a listing of the user's scheduled lineup of events 420, and a news feed section 430 that displays the activity of other users to which this user has subscribed to their news feeds, the number of subscriptions that this user has to other users, the number of other users that have subscribed to this individual's user profile, and a listing of upcoming events that the other users plan to attend.

When a user accesses another user's profile page, the user profile page can include a link 440 to subscribe to the user's news feed for notifying the subscriber of any events that the user has created or intends to attend.

Figure 5:
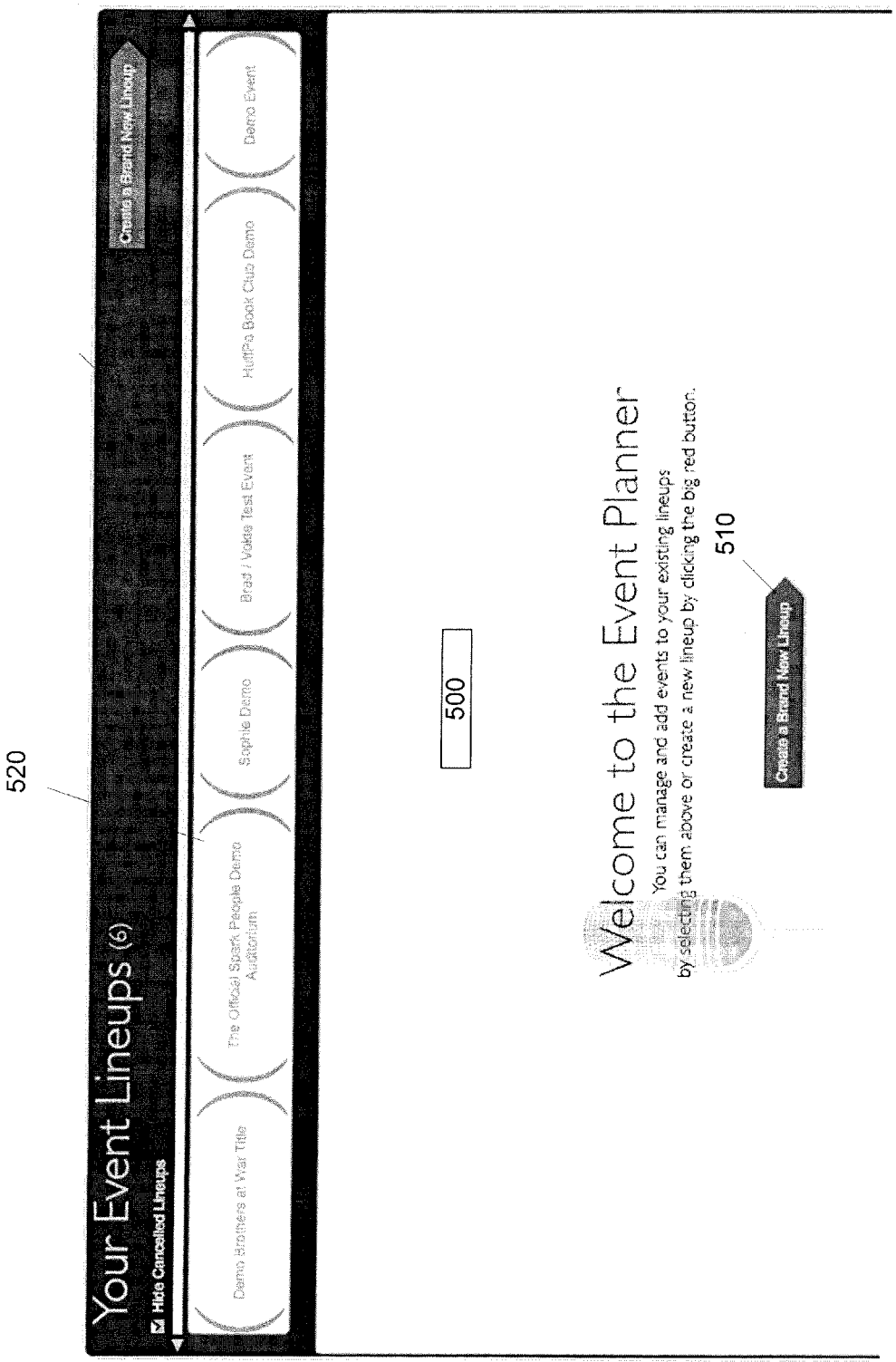
FIG. 5 shows an event planner page view of a graphical user interface, in accordance with an embodiment of the invention.

FIG. 5 shows an event planner page view of a graphical user interface, in accordance with an embodiment of the invention. In the event planner page view 500 of the graphical user interface 120, the user can create and schedule an event. To create an event, the user creates a lineup 510, which is a schedule of one or more events having the same title and description. The user can create and modify a distinct description for each event in a lineup. After creating a lineup, the user schedules a date and time for a new event (not shown). Hence, an event is an individual event, which is scheduled at a specific date and time determined by the end user. The event planner page view 500 also displays a list of lineups 520 that have already been scheduled, and can include a repository of recorded content to view, reorganize, modify, share or terminate.

Figure 6:
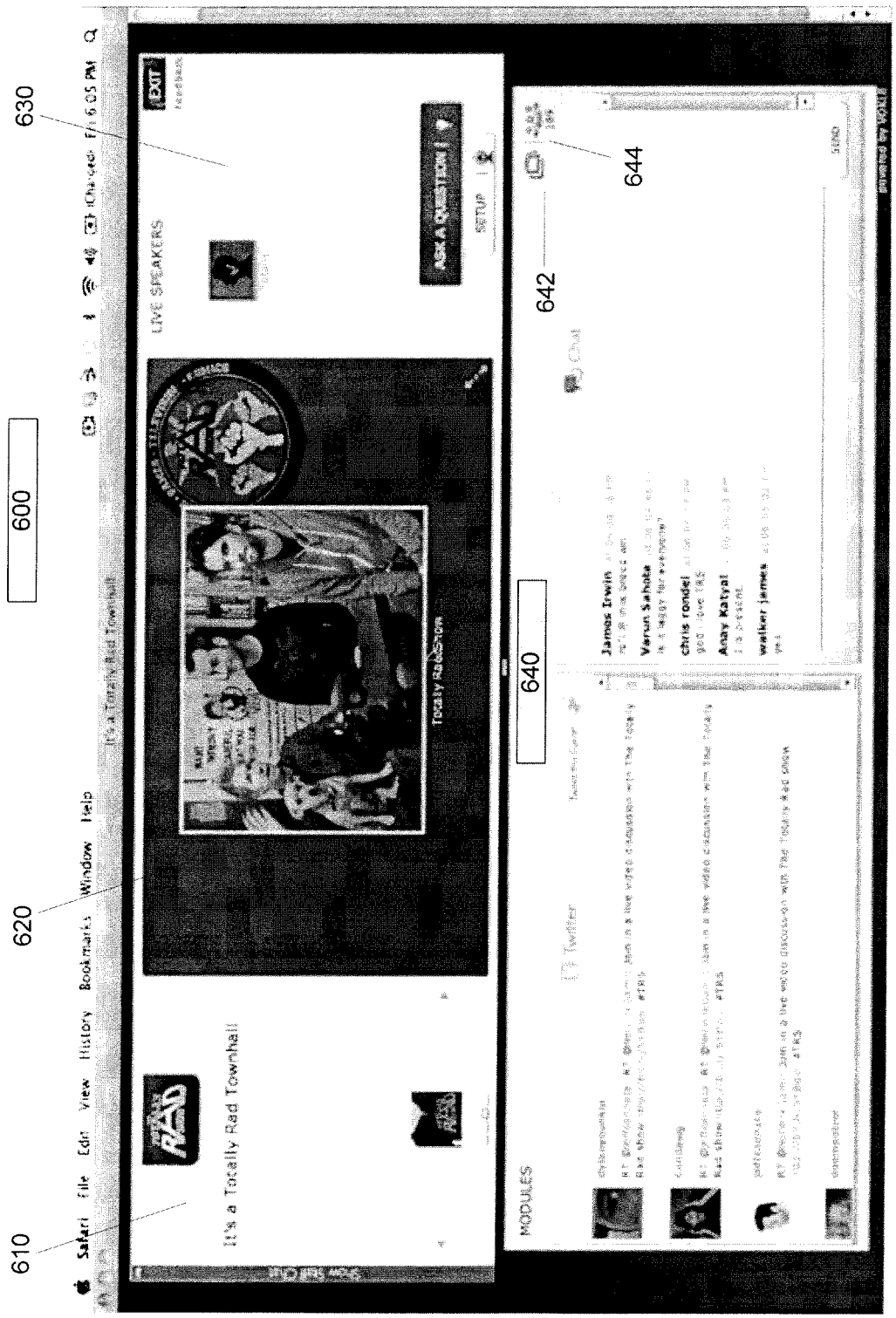
FIG. 6 shows an event page view of a graphical user interface, in accordance with an embodiment of the invention.

FIG. 6 shows an event page view of a graphical user interface, in accordance with an embodiment of the invention. The event page view 600 of the graphical user interface 120 includes a plurality of sections, as shown in FIGS. 7A-7G and discussed below in more detail, to facilitate the viewing and broadcasting of the town hall-type meeting, including receiving and responding to live video questions from audience members. The event page view 600 is displayed when an event has begun. When the event is started, the event is streamed at every event access point on the Internet (i.e., the event is streamed where the graphical user interface 120 has been embedded using the embedded player in a third party site or blog, and to users that are logged in directly to the system 100 via the web-based application of the platform. When a user joins the event, the system 100 is configured to assist the user with the set up the user's video camera and microphone to enhance the user's experience. When the user accesses the embedded player, it expands to a full browser mode, overlaying the page it is embedded on without the need to visibly bounce the user from the page that the player is embedded on (i.e., the user is now "inside" the event without leaving the webpage the event is embedded on). Through the embedded player, the user has access to all functionality that the user would have if he had accessed the system 100 directly via the web-based application of the platform (i.e., the user can register to access or log in to the system 100 directly through the embedded player).

The event page view 600 of the graphical user interface 120 includes a plurality of sections, which include an informational section 610, a broadcast area 620, an editing area 630, and a modules section 640. The modules section 640 includes a communication tab 642, a viewers tab 644 and a questions tab 646 (not shown).

Figure 7A:
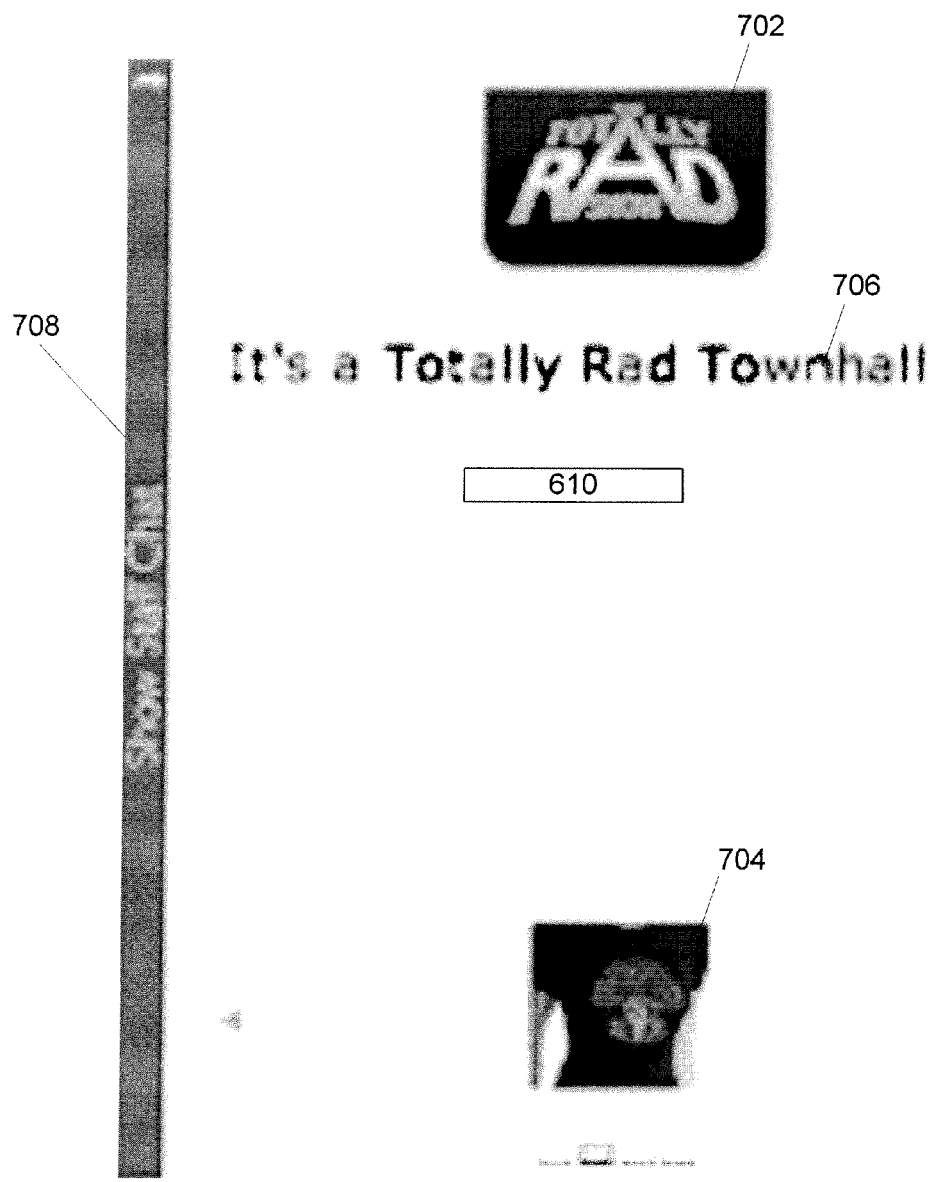
FIGS. 7A-7G show various sections of the event page view, in accordance with an embodiment of the invention.

FIGS. 7A-7F show various sections of the event page view, in accordance with an embodiment of the invention. For example, FIG. 7A shows the information section 610 of the event page view 600. The information section 610 can include at least one of a logo 702, a clickable banner image 704 (i.e., advertising or marketing materials), information about the event 706 (i.e., title and description), and a section for a private chat between the host, producer, co-host, screener and/or the editor 708.

Figure 7B:
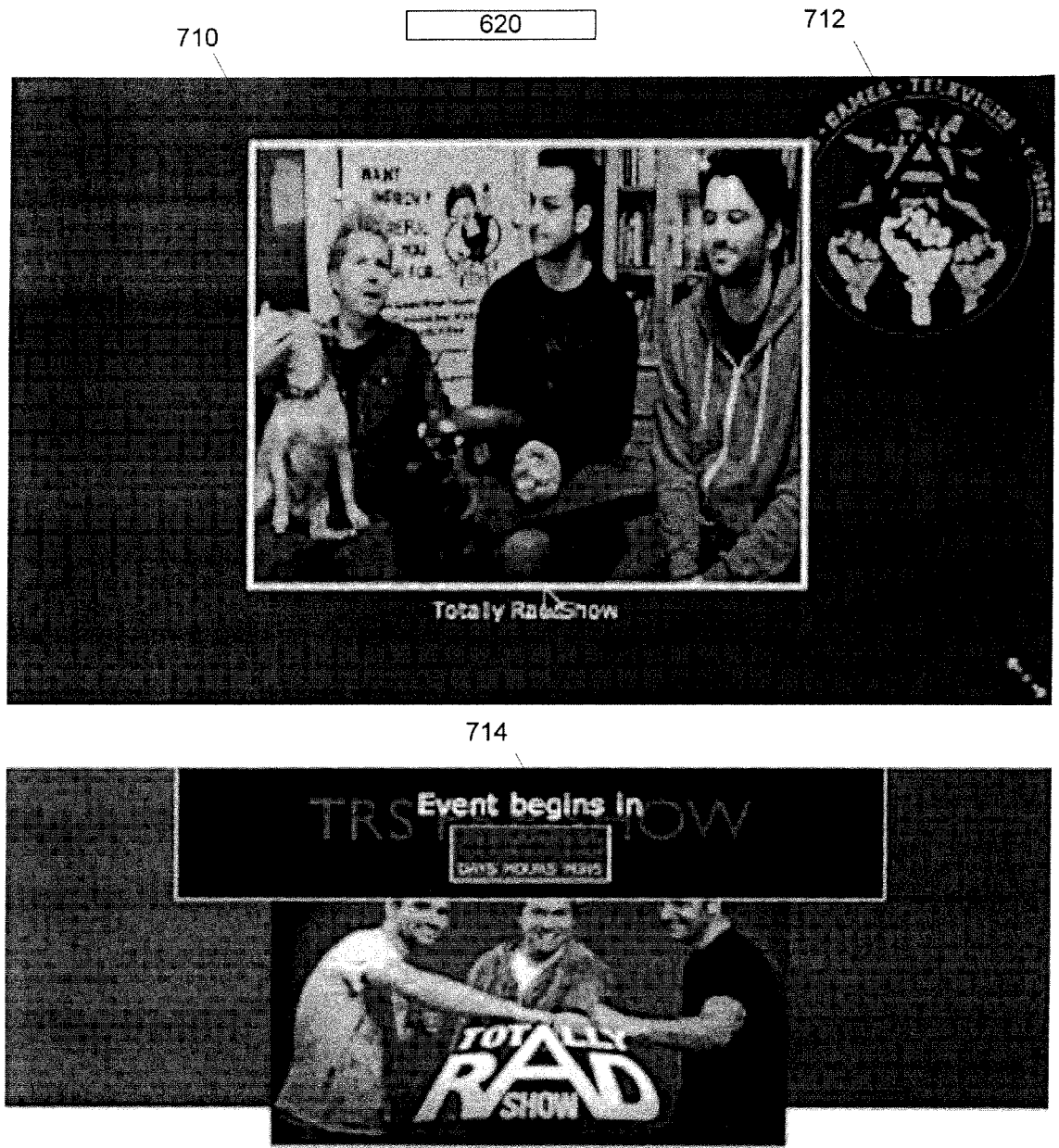

FIG. 7B shows the broadcast area 620 of the event page view 600. The broadcast area 620 can include at least one of an area for displaying a video stream of one or more users 710, an overlay of information to provide the host with hints and actions to run their event (not shown), an image selected by the host (i.e., fly files or video files) 712, and an advertisement, both statically and actively displayed before, during, and after the event, displaying information for, for example, the user or the user's sponsor (not shown). The broadcast area 620 can also include a video commercial break broadcasted, for example every 30 minutes, dynamically triggered and provided via a third party advertisement engine or company (i.e., YuMe™, Google™, etc.) (not shown). Additionally, before and after the event, the broadcast area 620 can include a "preview" screen 714 that displays a user selected thumbnail, a description of the event and a countdown timer indicating when the host is granted the ability to go live with the event. The "preview" screen 714 may be mirrored on the embedded player.

Figure 7C:
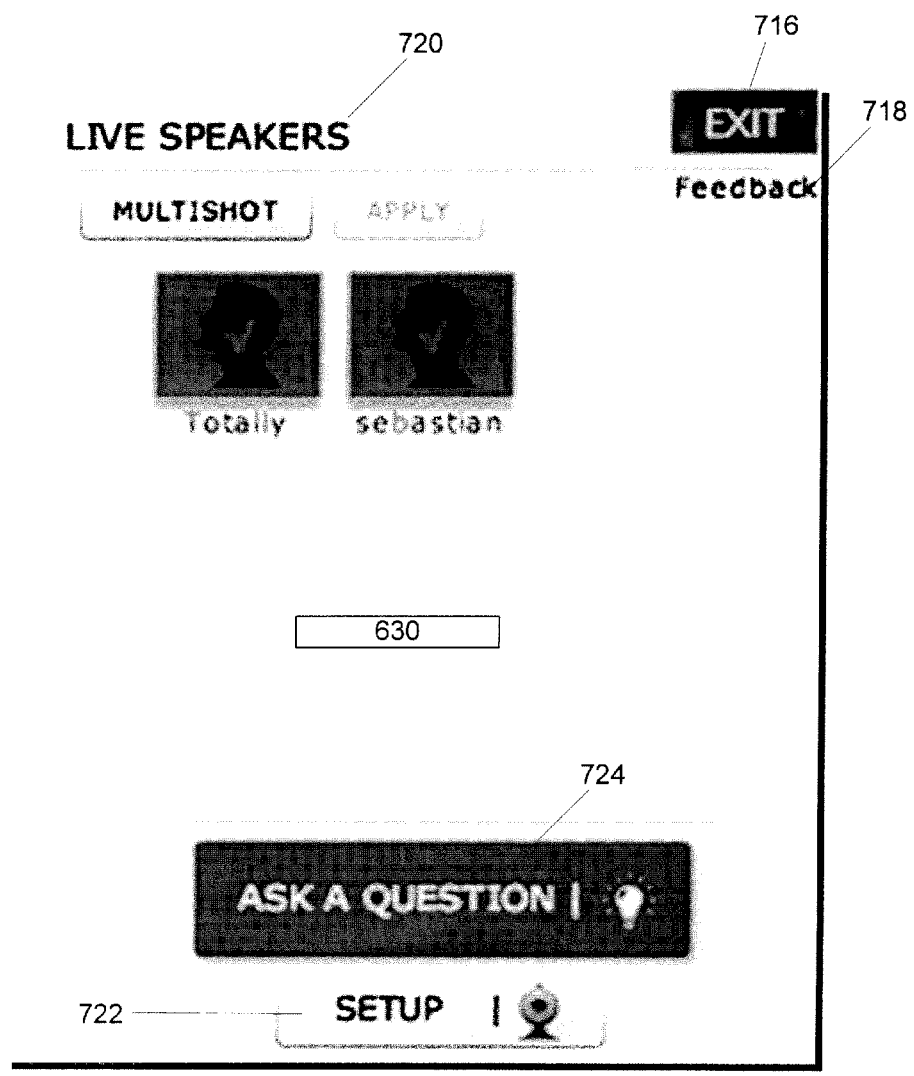

FIG. 7C shows the editing area 630 of the event page view 600. The editing area 630 can include at least one of an exit link 716 to exit the event, a feedback link 718 to provide feedback about the platform and/or the event, a live speaker area 720 that displays the thumbnails of the users that are broadcasting their video streams live and simultaneously to the audience members, and a "setup" button 722. As previously discussed for the user-types, the live speaker area 720 is role sensitive, such that only the host, producer, co-host or editor will be able to view the "multi-shot" button, and designate which user or users to promote to the status of a "live speaker." Multiple users may broadcast live in real-time. For a host or producer, the live speaker area 720 can also include "start" and "pause" button for starting and pausing the event (not shown). For an attendee, editor or screener, the live speaker area 720 can also include an "Ask a Question" button 724 for asking a question. For a co-host, neither button is present in the live speaker area 720. The "setup" button 722 provides the user with a hardware wizard for setting up or troubleshooting the user's webcam and microphone.

Figure 7D:
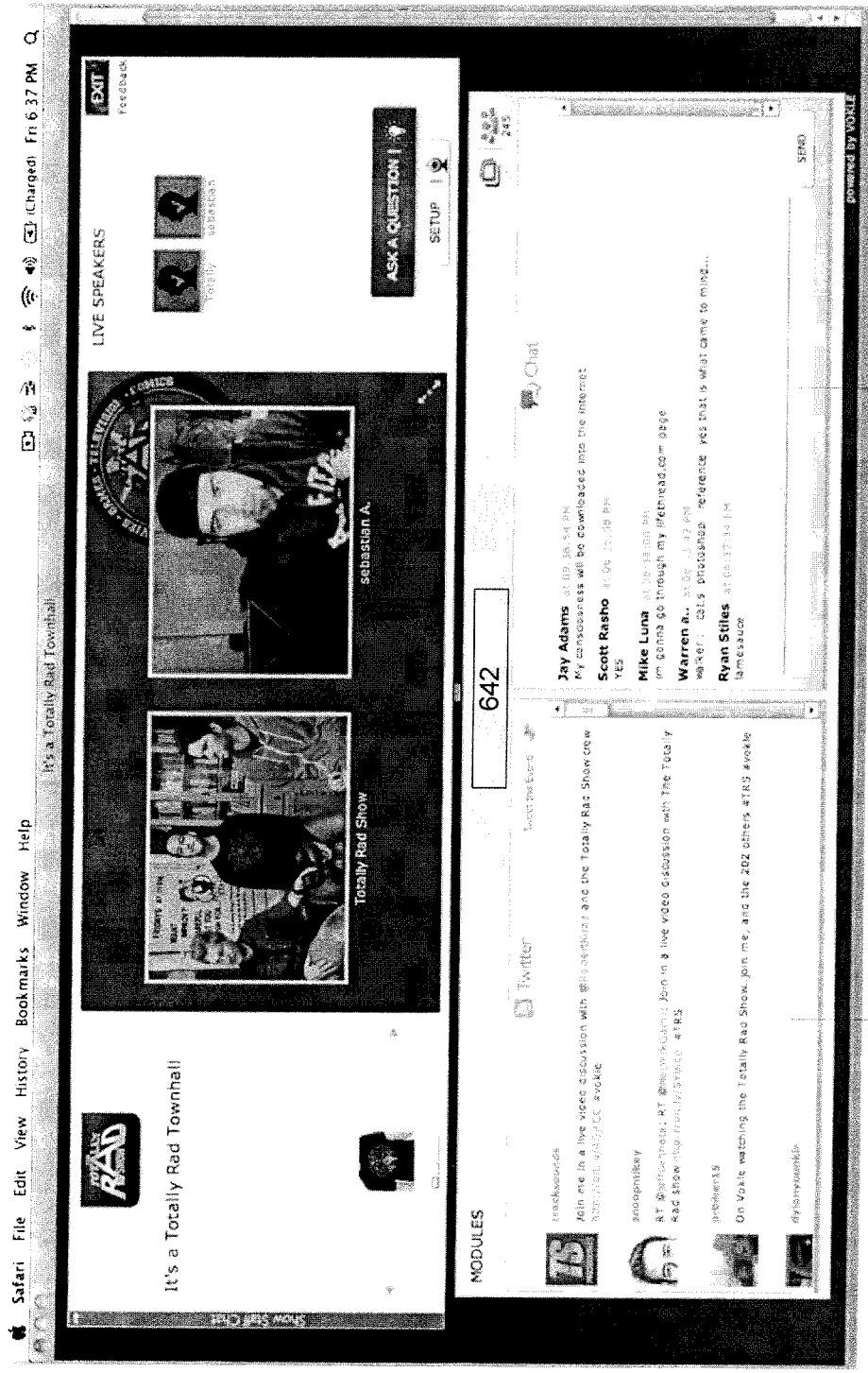

The modules section 640 includes a communication tab 642, a viewers tab 644 and a questions tab 646. FIG. 7D shows the communication tab 642 of the event page view 600. The communication tab 642 can include at least one of a text chat module 726 (i.e., text chat window), where any user attending the event can type a comment for the entire audience to see, a social media module 728 (i.e., a Twitter™ window), where a host, producer, co-host, screener or editor can search and display live social media content (i.e., live tweets via Twitter™) for the entire audience to see, or any other module that provides functionality to the viewing or broadcasting of the event.

Figure 7E:
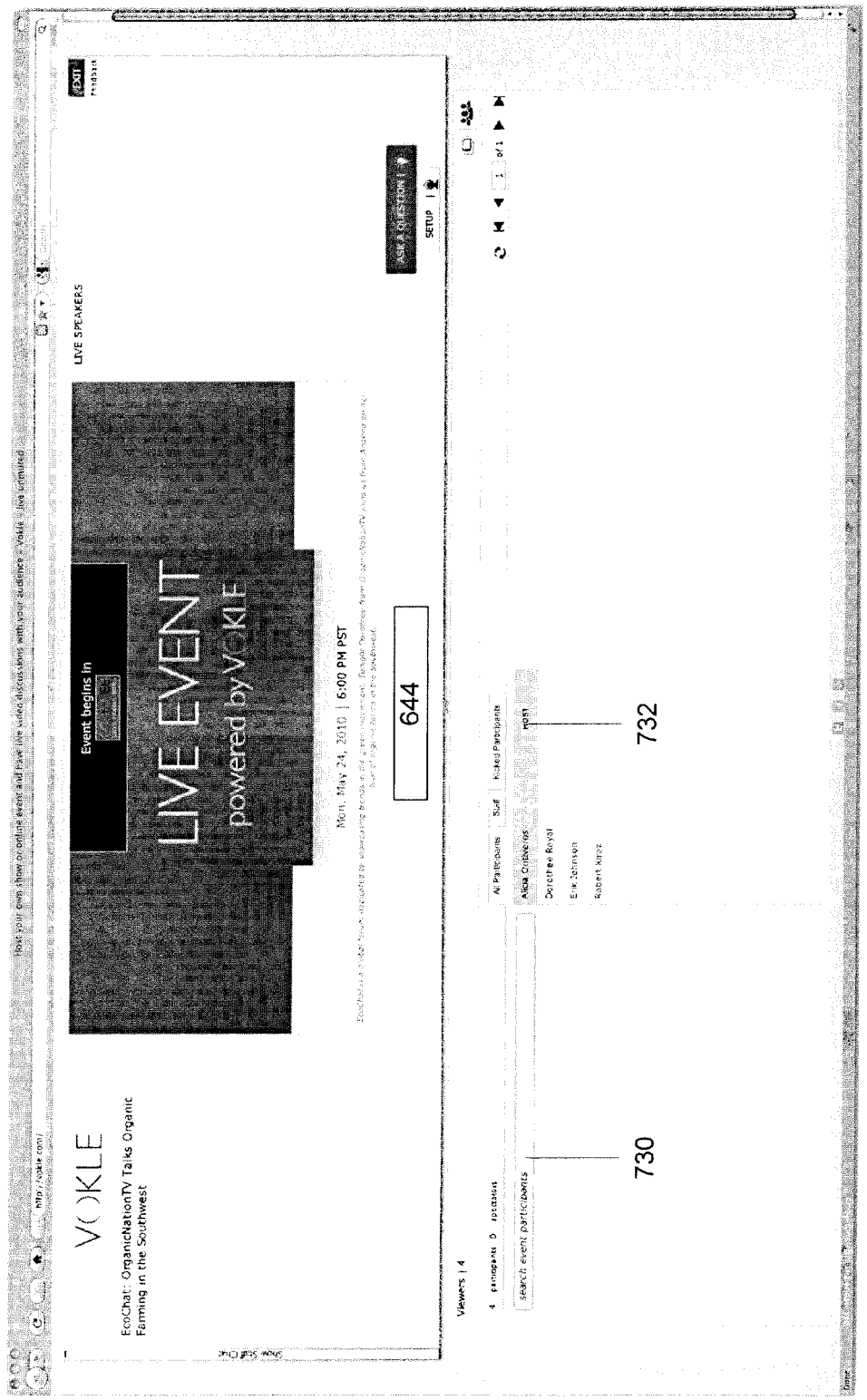

FIG. 7E shows the viewer's tab 644 of the event page view 600. The viewers tab 644 displays a list of all the users in the audience, both users directly accessing the event through the web-based application and users or "spectators" viewing the event via the embedded player. The viewers tab 644 allows users in the audience to search for other users attending the event 730, and allows the host, producer, co-host, screen and editor to assign roles to users in the audience 732 and to kick and un-kick users from the event not shown.

Figure 7F:

FIG. 7F shows the questions tab 646 of the event page view 600. The questions tab 646 displays a queue of attendees' live video, recorded video and text questions. A host, producer and co-host can browse the queue, read descriptions, view a submitted question, ping an attendee to confirm that the attendee is ready for the attendee's question to be aired on the event, remove the question from the queue and broadcast the question to the audience.

For a text or recorded video question, the host, producer or co-host can "take" the question (i.e., answer the question), and "drop" the text question or the call once it has been answered. When the text or recorded video question is taken, the text of the question or the recorded video is displayed in the broadcast area 620 for the audience members to see. For a live video question, the host, producer or co-host can "take" the call live by interacting/dialoguing directly with the user or "caller" to answer his question in real-time (i.e., a two-way interaction/dialogue in real-time, or multiple-way interaction/dialogue for multiple users).

Figure 7G:
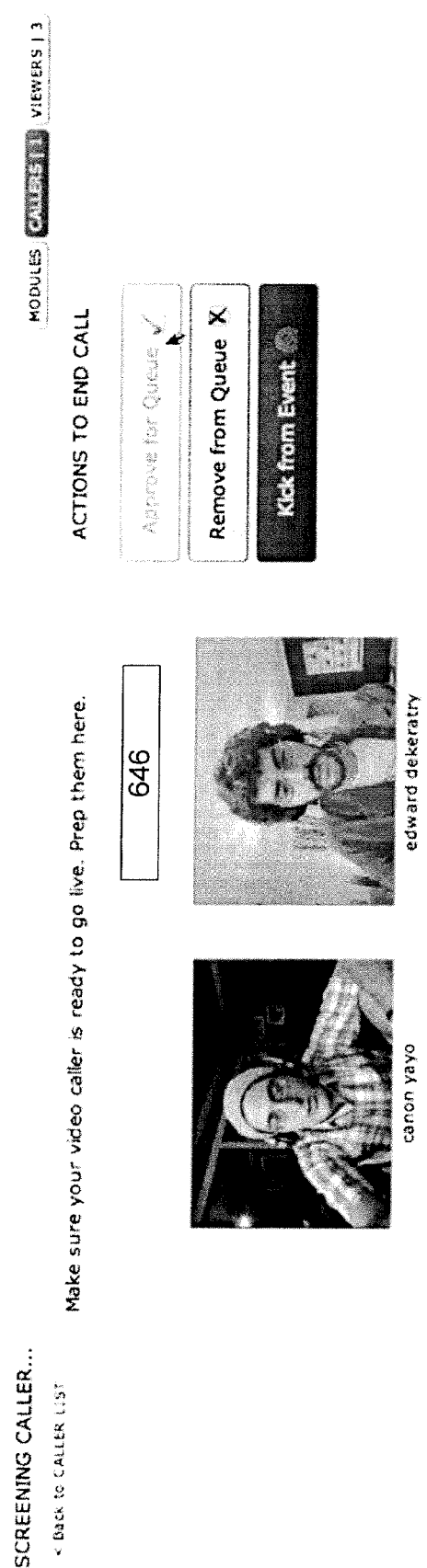

A screener can view the questions tab 646, like a host, producer or co-host, but rather than broadcasting the question, the screener can "pre-screen" the questions and the "caller" presenting the question, so that the host, producer or co-host does not have to perform this function, as shown in FIG. 7G. For example, the screener holds a private discussion "behind-the-scenes" with the live video "caller" to approve the "caller," remove the "caller" from the queue or kick the "caller" from the event. Furthermore, as previously discussed, the screener can provide annotations about the "caller" and his or her question for the host, co-host, or producer to review. This allows the host, producer or co-host to "take" those live video questions may be, for example, more relevant to the event or facilitate the presentation of the event.

Figure 8:
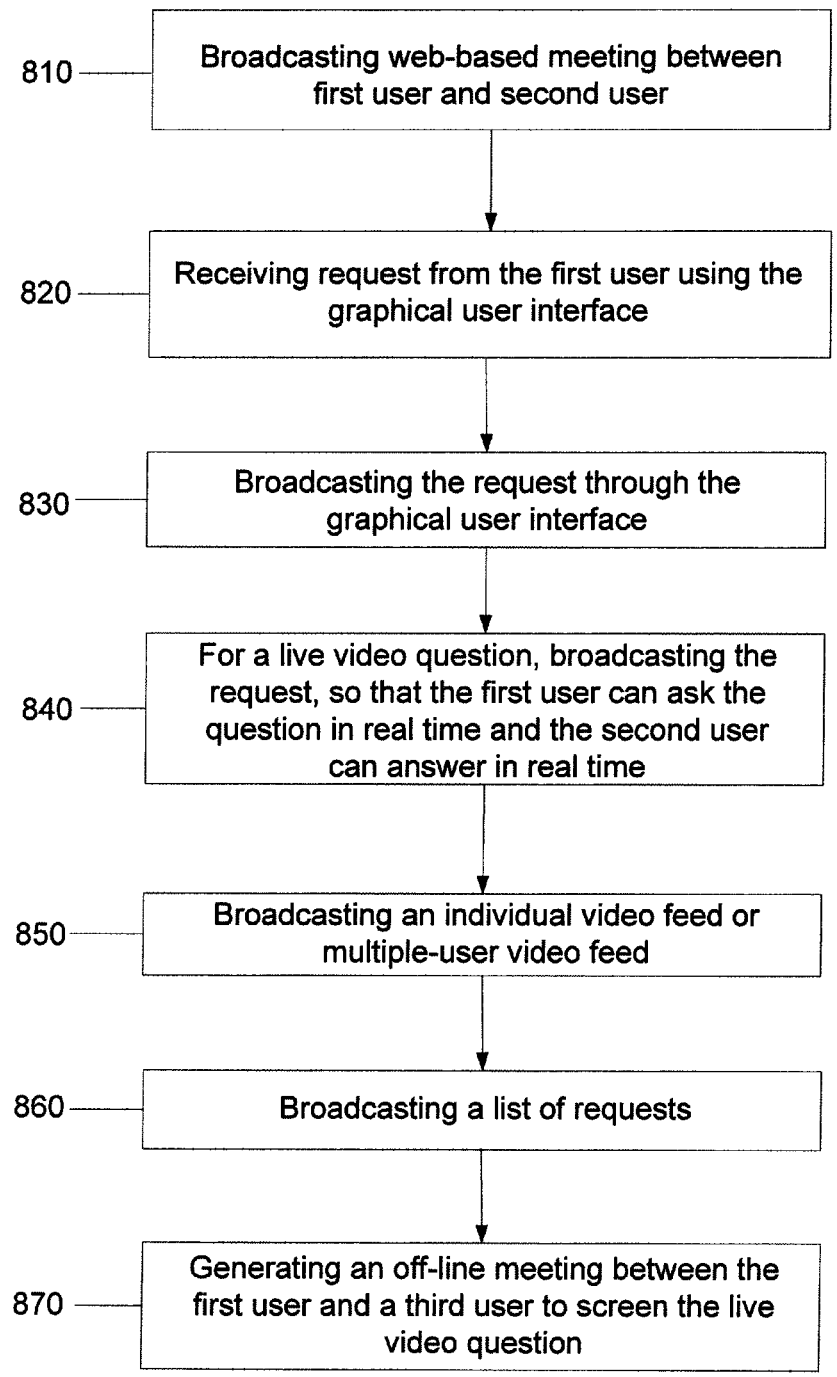
FIG. 8 shows a flow diagram of a method, in accordance with an embodiment of the invention.

FIG. 8 shows a flow diagram of a method, in accordance with an embodiment of the invention. The method includes broadcasting a web-based meeting between a first user and a second user through a graphical user interface (step 810). The method further includes receiving a request from the first user through the graphical user interface (step 820). The request can include one of a text question, a recorded video question and a request from the first user to present a live video question to the second user. The method further includes broadcasting the request through the graphical user interface (step 830). When the received request includes the request from the first user to present the live video question, the method includes broadcasting the request as a real time video feed of the first user, so that the first user can ask the question in real time and the second user can respond to the first user's question in real time (step 840).

The method may further include broadcasting, through the graphical user interface, an individual video feed of the first user, the second user and any other user that joins the web-based meeting, or multiple video feeds of any combination of users in real time (step 850). The method may further include broadcasting, through the graphical user interface, a list of requests from the first user or any other user. The list can be sorted (step 860).

The method may further include generating an off-line meeting between the first user and one of the other users, so that the one of the other users can screen the first user and the video question before the controller 110 broadcasts the received request (step 870).

Further to the discussion above, it is to be understood that in an embodiment of the invention, the steps and the like may be changed without departing from the spirit and scope of the present invention. In addition, the method described in FIG. 8 may be repeated numerous times.

A computer program code 220 according to certain embodiments of the invention, may be composed of modules that are in operative communication with one another, and which are designed to pass information or instructions to an electronic device, such as a mobile node or a user equipment, a personal computer, a handheld device, such as a mobile, a cellular telephone, or a personal digital assistant (PDA) having wireless communication capabilities, a portable computer having wireless communication capabilities and a portable unit or a terminal that incorporates combinations of such functions, as non-limiting examples.

The computer program code 220 may be configured to operate on a general purpose computer or an application specific integrated circuit (ASIC).

The computer readable (i.e., non-transitory) storage medium may include any media or means that may contain, store, communicate, propagate or transport the instructions for use by or in connection with an instruction execution system, apparatus, or device, for example, a disk media, computer memory, or other storage device. Non-transitory storage medium does not include a transitory signal. Examples of non-transitory storage medium may include, for example, a computer-readable medium, a computer distribution medium, a computer-readable storage medium, and a computer program product.

The embodiments of the invention discussed above may be implemented by hardware, computer software executable by one or more of the controller 110, the processor 230, or by a combination of hardware and software.

The software and/or hardware may reside on the controller 110, the processor 230, or other electronic devices. If desired, part of the software and/or hardware may reside on the controller 110 or the processor 230, and part of the software and/or hardware on other electronic devices. In an embodiment of the invention, software, or an instruction set may be maintained on any one of various conventional computer-readable media.

In accordance with an embodiment of the invention, there is provided a computer program product embodied on a non-transitory computer readable storage medium. The computer program product is encoded with instructions to control a processor to perform a process. The process includes broadcasting a web-based meeting between a first user and a second user through a graphical user interface. The process further includes receiving a request from the first user through the graphical user interface. The request can include one of a text question, a recorded video question and a request from the first user to present a live video question to the second user. The process further includes broadcasting the received request through the graphical user interface. When the received request includes the request from the first user to present the live video question, the process includes broadcasting the request as a real time video feed of the first user, so that the first user can ask the question in real time and the second user can respond to the first user's question in real time.

One having ordinary skill in the art will readily understand that the invention as discussed above may be practiced with steps in a different order, and/or with hardware elements in configurations which are different than those which are disclosed. Therefore, although the invention has been described based upon these preferred and non-limiting embodiments, it would be apparent to those of skill in the art that certain modifications, variations, and alternative constructions would be apparent, while remaining in the spirit and scope of the invention. Thus, the example embodiments do not limit the invention to the particular listed devices and technologies. In order to determine the metes and bounds of the invention, therefore, reference should be made to the appended claims.

We claim:

1. A system, comprising:
a controller comprising a processor and a memory, the controller configured to broadcast a web-based meeting between a plurality of audience members and a second user, the plurality of audience members comprising a first user; and
a graphical user interface configured to display the broadcasted web-based meeting,
wherein the controller is configured to:
receive, from the first user through the graphical user interface, a request from the first user to present a live video question to the second user,
broadcast, through the graphical user interface, a real time video feed of the first user, so that the first user can ask the question in real time and the second user can respond to the first user's question in real time,
receive, through the graphical user interface, a role assignment command that assigns a third user the role of a screener in the web based meeting,
initiate a private discussion between the first user and the third user so that the third user can screen the first user and the question before the controller broadcasts the real time video feed of the first user, and provide an annotation to the second user, the annotation being about the first user or the question.

2. The system of claim 1, wherein the graphical user interface comprises a web-based application that can be embedded on a third-party site or blog using embedded code, wherein the web-based application can be accessed without leaving the page that it is embedded on.

3. The system of claim 1, wherein the controller is configured to broadcast, through the graphical user interface, an individual video feed of the first user, the second user and a fourth user that joins the web-based meeting, or multiple video feeds of any combination of users in real time.

4. The system of claim 3, wherein the first user comprises an attendee of the web-based meeting, and wherein the second user or the fourth user comprises one of a host, a producer, a co-host, a screener, or an editor and an attendee of the web-based meeting.

5. The system of claim 1, wherein the controller is configured to broadcast, through the graphical user interface, a list of requests from the first user or any other user that joins the web-based meeting.

6. The system of claim 1, wherein the controller is configured to broadcast the received request, when the third user approves the first user and the video question.

7. The system of claim 1, wherein the private discussion comprises a video interaction between the first user and the third user.

8. The system of claim 1, wherein the private discussion comprises an off-line meeting.

9. The system of claim 1, wherein, prior to the third user being assigned the role of screener, the third user does not have a screener role in the web-based meeting.

10. The system of claim 1, wherein the third user is one of the plurality of audience members.

11. The system of claim 1, wherein the role assignment command is received from the second user.

12. The system of claim 1, wherein the role assignment command is received from a fourth user serving as a producer or co-host on the web-based meeting.

13. The system of claim 1, further comprising receiving, through the graphical user interface, a second role assignment command that assigns a fourth user a role during the web-based meeting.

14. The system of claim 1, wherein the role assignment command is received during the web-based meeting.

15. The system of claim 1, wherein the controller is further configured to:
display, before the controller broadcasts the real time video feed of the first user, a thumbnail video of the first user to the second user through the graphical user interface, and
receive, through the graphical user interface, a command to broadcast the real time video feed of the first user to the plurality of audience members on the web-based meeting.

16. The system of claim 15, wherein the thumbnail video is visible only to administrators of the web based meeting, the administrators comprising the second user.

17. The system of claim 15, wherein the thumbnail video is not broadcast to the audience members.

18. The system of claim 15, wherein the thumbnail video is displayed after the third user has reviewed the first user and the question.

19. The system of claim 15, wherein the command to broadcast the real time video feed of the first user is provided by the second user.

20. The system of claim 15, wherein the command to broadcast the real time video feed of the first user is provided by selecting the thumbnail.

21. The system of claim 1, wherein the controller is further configured to broadcast, through the graphical user interface, a list of requests from the first user or any other user that joins the web-based meeting.

22. The system of claim 1, wherein the controller is further configured to broadcast the received request, when the third user approves the first user and the video question.

23. An apparatus comprising the system of claim 1.

24. A method comprising:
broadcasting, with a controller comprising a processor and a memory, a web based meeting between a plurality of audience members and a second user, the plurality of audience members comprising a first user;
displaying, with a graphical user interface, the broadcasted web-based meeting;
receiving, from the first user through the graphical user interface, a request from the first user to present a live video question to the second user;
broadcasting, through the graphical user interface, a real time video feed of the first user, so that the first user can ask the question in real time and the second user can respond to the first user's question in real time;
receiving, through the graphical user interface, a role assignment command that assigns a third user the role of a screener in the web based meeting;
initiating a private discussion between the first user and the third user so that the third user can screen the first user and the question before the controller broadcasts the real time video feed of the first user; and
providing an annotation to the second user, the annotation being about the first user or the question.

25. The method of claim 24, further comprising receiving an indication of whether the first user must pay a fee to access the web based meeting.

26. The method of claim 25, wherein, in response to the indication being that the first user does not need to pay a fee to access the web based meeting, the controller provides a visual advertisement to the first user through the graphical user interface.

27. The method of claim 25, wherein the indication is received from the second user or third user through the graphical interface.

28. The method of claim 24, further comprising broadcasting, to the plurality of audience members, a visual advertisement.

29. The method of claim 28, wherein the visual advertisement interrupts the web based meeting.

30. The method of claim 28, wherein the visual advertisement comprises a video commercial break in the web-based meeting.

31. The method of claim 24, further comprising broadcasting, through the graphical user interface, an individual video feed of the first user, the second user, and a fourth user that joins the web-based meeting, or multiple video feeds of any combination of users in real time.

32. The method of claim 31, wherein the first user comprises an attendee of the web-based meeting, and wherein the second user or the fourth user comprises one of a host, a producer, a co-host, or an editor and an attendee of the web-based meeting.

33. The method of claim 31, further comprising broadcasting, through the graphical user interface, a list of requests from the first user or any other user that joins the web based meeting.

34. The method of claim 24, wherein the graphical user interface comprises a web-based application that can be embedded on a third-party site or blog using embedded code, and the web-based application can be accessed without leaving the page that it is embedded on.

35. The method of claim 24, further comprising displaying, before the controller broadcasts the real time video feed of the first user, a thumbnail video of the first user to the second user through the graphical user interface.

36. The method of claim 35, further comprising receiving, through the graphical user interface, a command to broadcast the real time video feed of the first user to the plurality of audience members on the web-based meeting.

37. The method of claim 24, further comprising receiving, through the graphical user interface, information related to a plurality of web-based meeting events, the information comprising the time, date and topic for each of the plurality of web-based meeting events.

38. The method of claim 37, further comprising creating a webpage for each of the plurality of web-based meeting events based on the information, the webpage displaying the time, date, and topic of the respective web based meeting event.

39. The method of claim 38, further comprising:
creating a profile webpage for one or more of the users;
displaying a lineup on the profile webpage, the lineup comprising the plurality of web-based meeting events; and
broadcasting, at the time and date of each respective web based meeting event, a web-based meeting between the host user and a plurality of attendee users through the graphical user interface.

* * * * *